United States Patent
Cheung et al.

(10) Patent No.: US 8,023,216 B1
(45) Date of Patent: Sep. 20, 2011

(54) CALIBRATING SERVOS

(75) Inventors: Man Cheung, Campbell, CA (US);
David Rutherford, San Jose, CA (US);
Jerry Richgels, San Jose, CA (US);
Perry Neos, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 252 days.

(21) Appl. No.: 12/192,984

(22) Filed: Aug. 15, 2008

Related U.S. Application Data

(60) Provisional application No. 60/955,990, filed on Aug. 15, 2007.

(51) Int. Cl.
*G11B 5/09* (2006.01)

(52) U.S. Cl. .......................... 360/51; 360/75
(58) Field of Classification Search .................. None
See application file for complete search history.

(56) References Cited

U.S. PATENT DOCUMENTS

| | | | |
|---|---|---|---|
| 5,668,679 A * | 9/1997 | Swearingen et al. | 360/75 |
| 6,967,799 B1 * | 11/2005 | Lee | 360/51 |
| 6,987,636 B1 | 1/2006 | Chue et al. | |
| 6,992,852 B1 | 1/2006 | Ying et al. | |
| 7,019,937 B1 | 3/2006 | Liikanen et al. | |
| 7,068,459 B1 | 6/2006 | Cloke et al. | |
| 7,088,533 B1 | 8/2006 | Shepherd et al. | |
| 7,113,362 B1 | 9/2006 | Lee et al. | |
| 7,158,336 B2 * | 1/2007 | Chan et al. | 360/77.05 |
| 7,167,333 B1 | 1/2007 | Liikanen et al. | |
| 7,209,312 B1 | 4/2007 | Sutardja | |
| 7,212,364 B1 * | 5/2007 | Lee | 360/51 |
| 7,248,427 B1 | 7/2007 | Everett et al. | |
| 7,411,758 B1 * | 8/2008 | Cheung et al. | 360/75 |
| 7,414,809 B2 * | 8/2008 | Smith et al. | 360/77.08 |
| 7,471,481 B2 * | 12/2008 | Lau et al. | 360/75 |
| 2007/0253084 A1 * | 11/2007 | Annampedu et al. | 360/39 |

OTHER PUBLICATIONS

U.S. Appl. No. 12/192,977, filed Aug. 15, 2008, to be published by the USPTO, application as filed, 39 pages.

* cited by examiner

*Primary Examiner* — Jason Olson

(57) ABSTRACT

Methods, systems, and apparatus, including computer program products are described for calibrating servos, and in some implementations, calibrating spiral servos for use in self-servo-write SSW processes. In one aspect, a method is provide that includes rotating a machine readable medium, and detecting a spiral on the machine readable medium. Detecting a spiral on the machine readable medium includes detecting magnitudes of the spiral and a timing mark, storing a timestamp from a clock signal that corresponds to the timing mark of the spiral, determining a peak of the spiral from the magnitudes, and locking the clock signal to the peak of the spiral using the timestamp.

11 Claims, 12 Drawing Sheets

CALIBRATING SERVOS

CROSS-REFERENCE TO RELATED APPLICATIONS

This application claims priority to U.S. Provisional Application Ser. No. 60/955,990, for "Methods to Sync Up Spiral Servo in SSW," filed on Aug. 15, 2007, which is incorporated by reference herein in its entirety.

TECHNICAL FIELD

The subject matter of this patent application relates to servos.

BACKGROUND

In magnetic-medium-based storage devices, data can be stored on circular, concentric tracks on a magnetic disk surface. A read/write head can retrieve and record data on a magnetic layer of a rotating disk as the head flies on a cushion of air over the disk surface. When retrieving data, magnetic field variations can be converted into an analog electrical signal, which can then be amplified and converted to a digital signal for signal processing. To guarantee the quality of the information stored on and read back from the disk, the read/write head needs to be precisely positioned at substantially the center of a track during both writing and reading. A closed-loop servo system, driven by servo information embedded in a dedicated portion of the track, can be used as a reference for positioning the head.

The servo information generally defines the position of the data tracks and is generally written with great accuracy to ensure that the head servo system operates properly. The servo information can be written on each surface as a radially extending set of spokes or wedges. The portion of a servo wedge at a particular track location may contain a sync field, and index mark, a gray coded track number, and two or more fine-positioned offset bursts configured in an echelon across the track. Head positioning relative to a track center can be determined and corrected, if necessary, by reading and noting the respective amplitudes and timings of the offset bursts.

A servo writer (e.g., a servo track writer (STW)) can be used to write the embedded servo information on the disk surface. A servo writer can include a large base (e.g., granite base) to minimize the effects of vibration. The servo writer also may use precision fixtures to hold the target drive, a precision, laser-interferometer-based actuator arm positioning mechanism to place the arms radially with respect to the axis of rotation of the disks in the drive, and an external clock head to position the servo wedges in time. Conventional servo writers are typically large in size and expensive to be manufactured. Further, as track density increases, the servo writing time required to write the servo information also increases, which can create a bottleneck in the disk drive manufacturing process.

Instead of using a STW to write a full set of servo tracks on a machine readable medium, a small band of seed tracks (e.g., two hundred servo tracks) can be written to facilitate a self-servo-write (SSW) process. A SSW process uses the same heads that are used to read/write data to write servo sectors. Alternatively, or in addition, spirals can be written, without using a STW, to facilitate a SSW process.

SUMMARY

Methods, systems, and apparatus, including computer program products, are described for calibrating servos, and in some implementations, calibrating spiral servos for use in SSW processes.

In one aspect, an apparatus is provided that includes a servo track detector that detects a spiral on a machine readable medium, a clock generator that generates a clock signal and locks the clock signal to timing marks of the spiral to calibrate an average spiral peak time, and a servo track window period generator that generates a spiral window to determine a location of the spiral using the average spiral peak time. Other embodiments of this aspect include corresponding systems, methods, and computer program products.

One or more implementations can optionally include one or more of the following features. The servo track detector can include a detection module that determines spiral peak times using the spiral window. The servo track detector can further include a comparison module that determines a timing offset between the clock signal and timing marks of the spiral. The apparatus can further include a servo track generator that generates servo tracks using the spiral. The apparatus can further include an error correction module that applies repetitive error control.

In another aspect, a method is provided that includes locking a clock signal to a back electromotive force signal associated with a rotating machine readable medium, and seeking to an inner diameter of the machine readable medium. The method also includes detecting a spiral on the machine readable medium, and locking the clock signal to timing marks of the spiral. Locking the clock signal to timing marks of the spiral includes: calibrating a timing offset between the clock signal locked to the back electromotive force signal and the timing marks of the spiral, and calibrating an average spiral peak time using the clock signal. The method also includes determining a location of the spiral using the average spiral peak time, and calibrating a spiral servo according to the location of the spiral. Other embodiments of this aspect include corresponding systems, apparatus, and computer program products.

One or more implementations can optionally include one or more of the following features. Seeking to an inner diameter can include seeking to a crash stop of the machine readable medium. The method can further include seeking away from the inner diameter of the machine readable medium, and writing servo tracks using the spiral servo. Locking the clock signal to timing marks can further include applying repetitive error control.

In another aspect, an apparatus is provided that includes a servo track detector that detects a spiral on a machine readable medium; a clock generator that generates a clock signal and locks the clock signal to timing marks of the spiral; and a servo track window period generator that generates a spiral window to determine a location of the spiral using a peak of the spiral. Other embodiments of this aspect include corresponding systems, methods, and computer program products.

One or more implementations can optionally include one or more of the following features. The servo track detector can include a detection module that detects magnitudes of the spiral using the spiral window and determines the peak of the spiral. The clock generator can include a calibration module to lock the clock signal to the peak of the spiral. The apparatus can further include a servo track generator that generates servo tracks using the spiral.

In another aspect, a method is provided that includes rotating a machine readable medium, and detecting a spiral on the machine readable medium. Detecting a spiral on the machine readable medium includes detecting magnitudes of the spiral and a timing mark. The method further includes storing a timestamp from a clock signal that corresponds to the timing mark of the spiral; determining a peak of the spiral from the magnitudes; and locking the clock signal to the peak of the spiral using the timestamp. Other embodiments of this aspect include corresponding systems, apparatus, and computer program products.

One or more implementations can optionally include one or more of the following features. The method can further include determining a location of the spiral using the clock signal, and calibrating a spiral servo according to the location of the spiral. Calibrating the spiral servo can include generating a spiral window at the location of the spiral. The method can further include writing servo tracks using the spiral servo.

In another aspect, a system is provided that includes a machine readable medium and a servo controller. The servo controller includes a servo track detector that detects a spiral on the machine readable medium, a clock generator that generates a clock signal and locks the clock signal to timing marks of the spiral to calibrate an average spiral peak time, and a servo track window period generator that generates a spiral window to determine a location of the spiral using the average spiral peak time. Other embodiments of this aspect include corresponding methods, apparatus, and computer program products.

Particular embodiments of the subject matter described in this specification can be implemented to realize none, one or more of the following advantages. Calibrating servos to track follow spirals enables the use of SSW processes, thereby reducing the use of STWs for writing servo tracks and reducing costs associated with the use of STWs (e.g., monetary costs, such as use of manufacturing floor space, and time).

The details of one or more embodiments of the invention are set forth in the accompanying drawings and the description below. Other features and advantages of the invention will be apparent from the description and drawings, and from the claims.

DETAILED DESCRIPTION

Figure 1A:
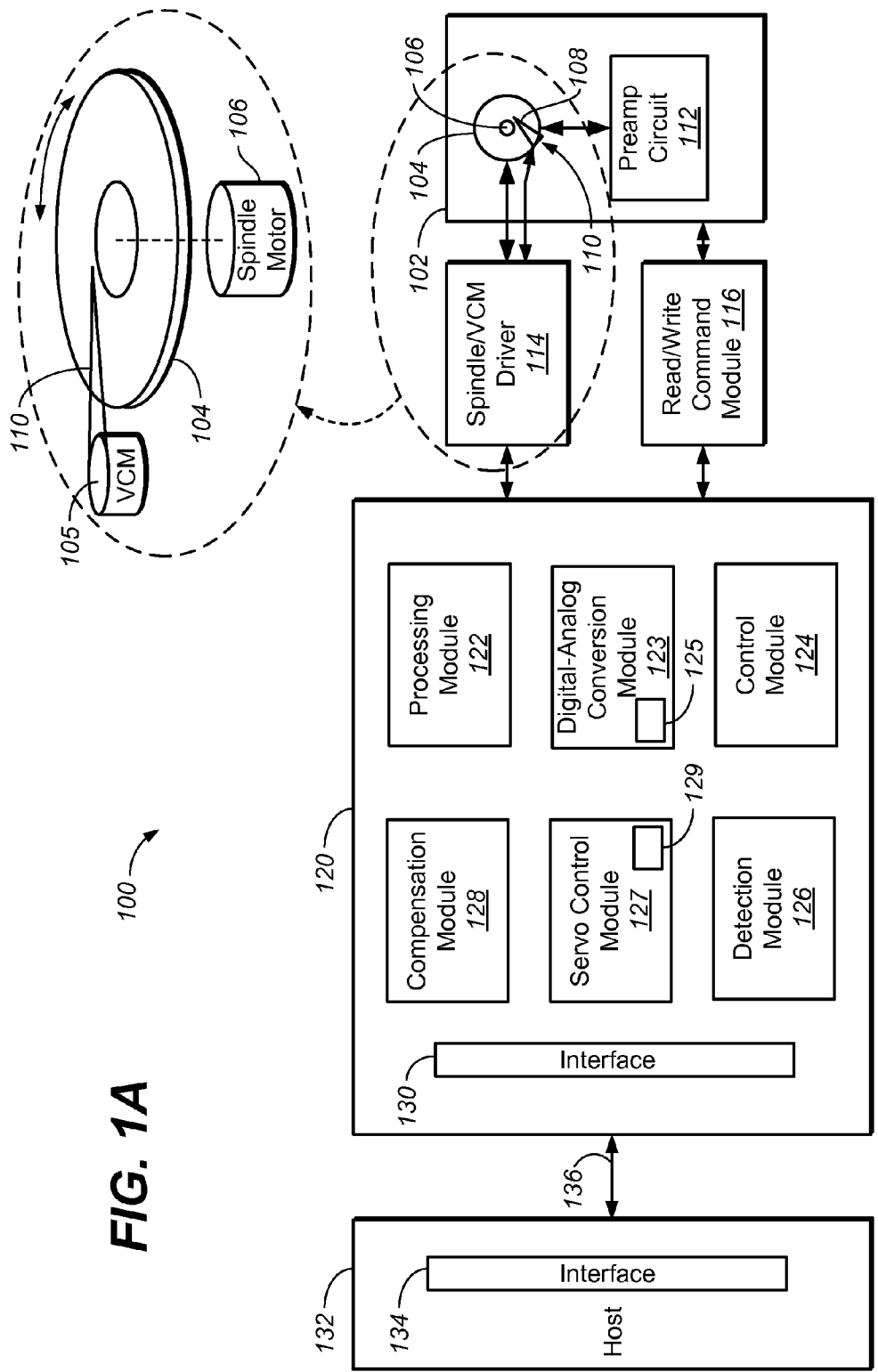
FIG. 1A is a conceptual block diagram of an example hard disk drive system.

FIG. 1A is a conceptual block diagram of an example hard disk drive (HDD) system 100. As shown in FIG. 1A, the HDD system 100 includes a printed circuit board (PCB) 120. The PCB 120 includes a processing module 122, a digital-analog conversion module 123 having a digital-analog converter 125, a control module 124, a detection module 126, a servo control module 127, a compensation module 128 and a communications interface 130, each of which is connected through one or more internal buses (not shown).

The processing module 122 can perform data and/or control processing related to the general operation of the HDD system 100. For example, the processing module 122 can execute instructions received from the control module 124 to control disk drive functions. These functions can include, for example, reading and decoding host commands, starting up and controlling the speed of the spindle motor 106, minimizing head positioning servo off track error through the control of the voice coil motor (VCM) 105, and managing power consumption of the HDD system 100.

The processing module 122 can include volatile memory (e.g., SDRAM or other types of low latency memory) for storing, for example, volatile control data associated with the control of the HDD system 100, and non-volatile memory (e.g., flash memory) for storing, for example, critical data such as non-volatile control code. The control data and control code can include instructions that the processing module 122 executes or utilizes, as well as tables, parameters, or arguments used during the execution of these instructions. In some implementations, the processing module 122 also can store various firmware routines for controlling the operation of the spindle motor 106 such as, without limitation, startup routines, speed control routines, spin down routines and parking routines.

The processing module 122 can include registers and buffers for storing, for example, flags indicating whether a spin-up operation has been successfully completed. Alternatively, the flags can be stored in a register defined by a memory location in a memory unit separate from the processing module 122.

In some implementations, the processing module 122 can include a pulse width modulation (PWM) controller (not shown) for generating control signals so as to control the spindle/VCM driver 114 to drive the spindle motor 106 at a substantially constant speed while the disk drive is in use. The spindle/VCM driver 114 can receive VCM control signals from the PWM controller and generate a corresponding command signal to command the VCM 105 for positioning the actuator arm 110 and the read/write head 108, for example, as part of a parking operation. The VCM 105 can be controlled by the servo control module 127, and can be configured to apply torque to the read/write head 108 to swing the read/write head 108 during, for example, a track-seeking operation and to maintain the head 108 at a desired angular position during a track-following operation.

The spindle/VCM driver 114 can, in some implementations, include an electromotive force (EMF) detector (not shown) for detecting a back electromotive force (BEMF) associated with one or more windings of the spindle motor. The control module 124 can communicate with the spindle/VCM driver 114, for example, to receive zero crossing information to be used for identifying the instant at which a zero crossing occurs (e.g., a zero crossing in the BEMF induced in a floating winding), and for determining a spin-rate of the spindle motor. As an example, while the spindle motor 106 is rotating, the EMF detector can detect the BEMF zero crossing point for an un-driven winding to generate a zero crossing signal (e.g., by counting clock pulses and determining time elapsed between the consecutive detected zero crossings). The control module 124 can receive the zero crossing signal and provide information associated with the zero crossing signal to the processing module 122, for example, to compute the velocity of the spindle motor 106.

The control module 124 can function to manage and handle data transfer between the PCB 120 and the host 132 during read and write operations through the communications interfaces 130/134. The control module 124 also can include servo logic for managing the positioning of the read/write head 108 when seeking (e.g., moving from one track to a non-adjacent track) and during tracking (e.g., staying on a single track).

The control module 124 can communicate with the communications interface (e.g., an input/output interface) 130 and with the spindle/VCM driver 114 or the read/write command module 116. The control module 124 can coordinate control of the spindle/VCM driver 114, the read/write command module 116, the processing module 122, the compensation module 128 and the detection module 126.

The control module 124 can receive a command from the host computer 132 to generate a spin-up command while the spindle motor 106 is at rest to begin the spin-up mode of operation. The processing module 122 can receive the spin-up command from the control module 124 and retrieve an associated control routine for the spin-up mode of operation from a memory unit.

During write operations, the read/write command module 116 can encode (e.g., using run length limited coding (RLL)) data to be written by the read/write head 108 and generate encoded write signals. The read/write command module 116 also can process the write signals providing a reliability check and can apply, for example, error correction coding (ECC) and similar algorithms to allow for the verification of the integrity of the data that is written. During read operations, the read/write head 108 can generate read signals (e.g., analog signals), and the read/write command module 116 can convert the analog read signals into digital read signals. The converted signals can be detected and decoded by conventional techniques to recover data written by the read/write head 108.

Signals between the HDD head assembly 102 and the PCB 120 can be carried, for example, through a flexible printed cable. The HDD head assembly 102 can include one or more magnetic disks or platters 104 for storing magnetic data. The platters 104 can be rotated by the spindle motor 106. The spindle motor 106 can rotate the magnetic platters 104 at a controlled speed during the read/write operations. The read/write actuator arm 110 can move relative to the magnetic platters 104 in order to read and/or write data to/from the magnetic platters 104. The spindle/VCM driver 114 can be configured to control the spindle motor 106, which rotates the magnetic platters 104. If desired, the spindle/VCM driver 114 also can generate control signals for positioning the read/write actuator arm 110 using the voice coil actuator 105, a stepper motor or any other suitable actuator.

The read/write head 108 can be located near a distal end of the read/write actuator arm 110. The read/write head 108 can include a write element (e.g., an inductor) that generates a magnetic field, and a read element (e.g., a magneto-resistive (MR) element) that senses the magnetic field on the magnetic platters 102.

The HDD head assembly 102 also can include a preamp circuit 112. The preamp circuit 112 can operate either in a read mode or write mode, and can communicate with one or more transducers (not shown). A transducer can generate a low level analog read signal, and send the analog read signal to the preamp circuit 112 to produce an amplified read signal. During a user-data read operation, the amplified read signal serially defines the servo information and user data. The servo information can include positioning data information such as track identification data information and fine positioning information. During a write operation, the preamp circuit 112 also can provide write current via a write data signal to a selected transducer for writing a sequence of symbols onto the magnetic platters 104. The write current changes polarity upon each change in the binary value of the write data signal.

In some implementations, portions of the HDD system 100 can be implemented as one or more integrated circuits (IC) or chips. For example, the processing module 122 and the control module 124 can be implemented in a single chip. As another example, the spindle/VCM driver 114 and the read/write command module 116 can be implemented in a same (or different) chip as the processing module 122 and the control module 124. As yet another example, the HDD system 100 other than the HDD head assembly 102 can be implemented as a system-on-chip.

In general, the spindle motor 106 can have different power requirements based on different operational configurations. For example, initial acceleration (e.g., during spin-up process) of the spindle motor 106 can require a high value of current relative to operation at steady-state velocity. As the spindle motor 106 reaches a desired operating velocity, the average motor current requirement can decrease substantially to maintain the head at a desired track.

Information can be stored on each platter 104 in concentric tracks. Data tracks can be divided into sectors. Information can be written to and/or read from a storage surface(s) of a disk by the read/write head 108. The read/write head 108 can be mounted on the actuator arm 110 capable of moving the read/write head 108, e.g., radially over the platter 104. The movement of the actuator arm 110 can allow the read/write head 108 to access different data tracks. The platters 104 can be rotated by the spindle motor 106 at a relatively high speed. The read/write head 108 can access different sectors within each track on the platter 104.

Operation of the actuator arm 110 can be controlled by the servo control module 127. The servo control module 127 can move the read/write head 108 according to two primary operations: seek control operation and track following operation.

In a seek control operation, the servo control module 127 controls the actuator arm 110 such that the read/write head 108 can be transitioned from an initial position to a target track position for which the host 132 has requested. A seek control operation generally includes accelerating, decelerating and settling the VCM 105 at a predetermined speed. In general, the servo control module 127 can initiate a seek control operation when the host 132 issues, for example, a seek command to read data from or write data to a target track on the platters 104.

As the read/write head 108 approaches a target track, the servo control module 127 can settle the actuator arm 110. During settling, the servo control module 127 can bring the head 108 to rest over a target track within a selected settle threshold or window, which can be based on a percentage of the track width from the center of the track. The servo control module 127 can employ, for example, a pre-loaded algorithm, to ensure that the head 108 is positioned on the target track with sufficient accuracy to write (and read). This process can require counting servo position samples occurring within the settle window. For example, a write operation can be initiated after observing one or more consecutive positioning samples that are within certain areas of a data track. A wide variety of settle criteria can be employed, in ensuring positioning accuracy.

After the head 108 is settled over a desired track, the servo control module 127 can initiate a track following mode. In the track following mode, the head 108 can be positioned and maintained at a desired position with respect to the target track (e.g., over a centerline of the track) or over a defined radial location along a track on the disk until desired data transfers are complete and another seek is performed.

The digital-analog conversion module 123, which includes a digital-analog converter 125, can operate to convert data between the digital form used by the PCB 120 and the analog form conducted through the head 108 in the HDD head assembly 102. The HDD head assembly 102 can provide servo position information read by the head 108 to the servo control module 127. Servo sectors on each of the platters 104 can include head location information, such as a track identification field and data block address, for identifying a target track and data block, and burst fields to provide servo fine location information. The head location information read by the head 108 can be converted from analog signals to digital data by the digital-analog converter 125, and fed to the servo control module 127. The servo positional information can be used to detect the location of the head 108 in relation to a target track or target data sectors on the platters 104. The servo control module 127 can utilize, for example, target data sectors and servo position information to precisely place the head 108 over the target track and data sector on the platters 104, and to continuously maintain the head 108 aligned with the target track while data is written/read to/from one or more identified data sectors.

The digital-analog conversion module 123 can include a digital-analog converter (DAC) 125 for converting control signals (e.g., for controlling the position of the head 108) generated by the control module 124 into analog signals (and from analog signals into digital data). For example, a head position signal can be generated by the control module 124 and provided to the DAC 125. The DAC 125 can convert the head position signal into an analog signal (e.g., a voltage signal) for driving the VCM 105 coupled to the actuator arm 110. The actuator arm 110 can subsequently move the head 108 along the surface of the platters 104 based on the analog signal provided by the DAC 125.

In some implementations, the DAC 125 can be configured to output, for example, different analog voltage ranges to account for resolution needs at different operating conditions. In these implementations, the DAC 125 can have one or more selectable modes. For example, the DAC 125 can utilize certain modes (i.e., referred to here as "higher modes") to provide a larger voltage range and bigger current scale but at a lower resolution (volts/digital count). In these implementations, higher modes can be used, for example, during seeking control operations where a large voltage range is generally desirable. Conversely, the DAC 125 can employ other modes (i.e., referred to here as "lower modes") to provide a higher resolution (e.g., smaller voltage steps per digital count). Lower modes can be used, for example, for track following operations where high resolution is critical to servo tracking performance.

In some implementations, the servo control module 127 can include a servo controller 129 to control mechanical operations related to servo processing, such as, but not limited to, head positioning (e.g., through the HDD head assembly 102) and rotational speed control (e.g., through the VCM 105).

Figure 1B:
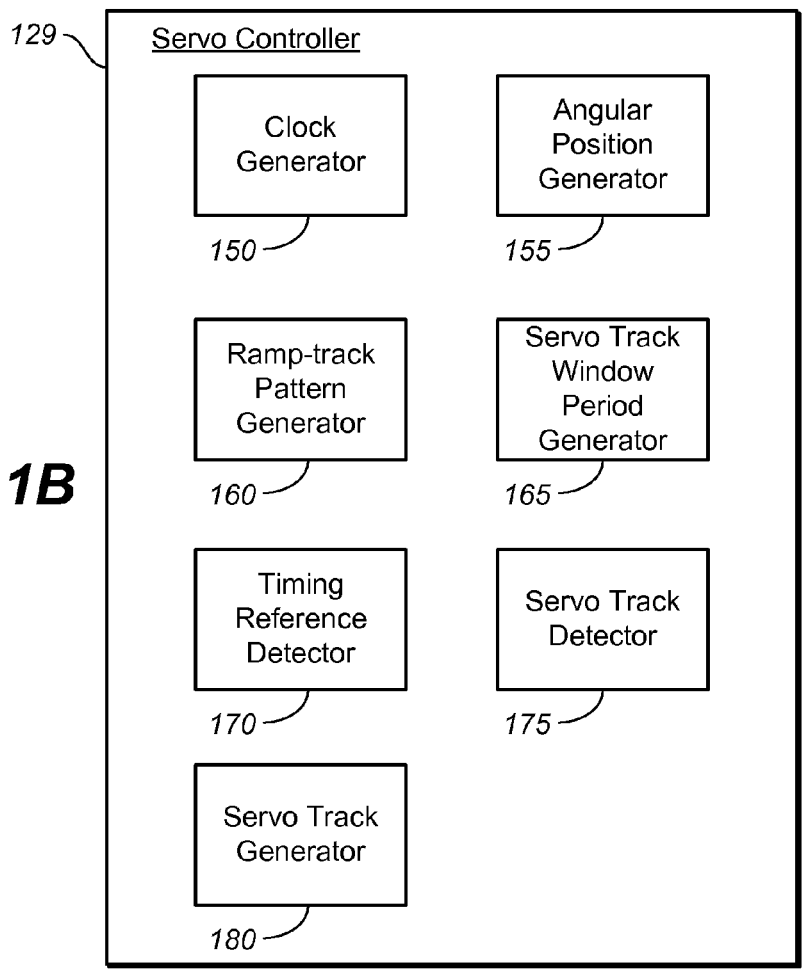
FIG. 1B is a conceptual block diagram of an example servo controller of FIG. 1A.

FIG. 1B is a conceptual block diagram of the example servo controller 129 of FIG. 1A (e.g., a SSW controller). The servo controller 129 includes a clock generator 150, an angular position generator 155, a ramp-track pattern generator 160, and a servo track window period generator 165. The servo controller 129 can further include a timing reference detector 170, a servo track detector 175, and a servo track generator 180. In some implementations, the timing reference detector 170 can detect back electromotive force pulses associated with rotation by a motor of a machine readable medium (e.g., a blank disk rotating at a constant angular velocity). The BEMF pulses can be used as timing reference information. In addition, or alternatively, the timing reference detector 170 can detect timing tracks that have been previously written on the machine readable medium (e.g., seed tracks with timing marks). The clock generator 150 can generate a signal (e.g., a clock signal) that is locked to the velocity of the rotating machine readable medium. The angular position generator 155 can determine a position of a servo track (e.g., a spiral) using the clock signal.

Figure 2:
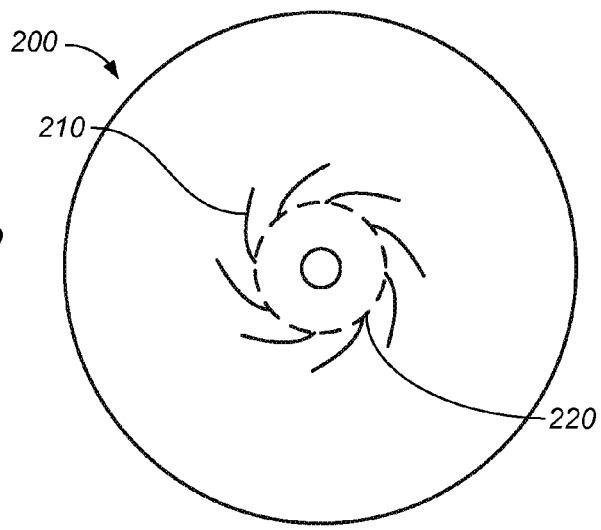
FIG. 2 is a schematic diagram of an example machine readable medium that includes spirals.

FIG. 2 is a schematic diagram of an example machine readable medium 200 that includes spirals 210. The spirals 210 can be written using the same read/write heads of a hard disk drive that are used to read/write data on the machine readable medium 200. The pattern (e.g., a spiral) of the tracks can be generated by the ramp-track pattern generator 160, for example. In some implementations, the ramp-track pattern generator 160 can generate ramp tracks in other patterns (e.g., concentric ramp tracks). The spirals 210 can be used to facilitate a SSW process. In some implementations, the spirals 210 do not have seed wedge patterns that can be used to locate the spirals 210.

The machine readable medium 200 includes a crash stop 220. The crash stop 220 can be used as a reference (e.g., a fixed mechanical datum) to determine a location (e.g., a radial location) on the machine readable medium 200. In some implementations, spirals (e.g., the spirals 210) can be written at the crash stop (e.g., the crash stop 220). The spirals written at the crash stop can be referred to as "crash stop spirals". The crash stop spirals can be the first set of spirals written to the machine readable medium. The crash stop spirals can be written at the crash stop (e.g., beginning at the crash stop), so that there is useable position information at the crash stop to determine a location on the machine readable medium.

Synchronizing a servo (e.g., a spiral servo) can include moving the heads to the crash stop to locate a spiral. The crash stop can be used as the datum to locate the spirals. The useable position information at the crash stop can be used to determine the location of the spiral on the machine readable medium. The servo can be synchronized using timing and position information from spiral data in the crash stop spiral.

Figure 3:
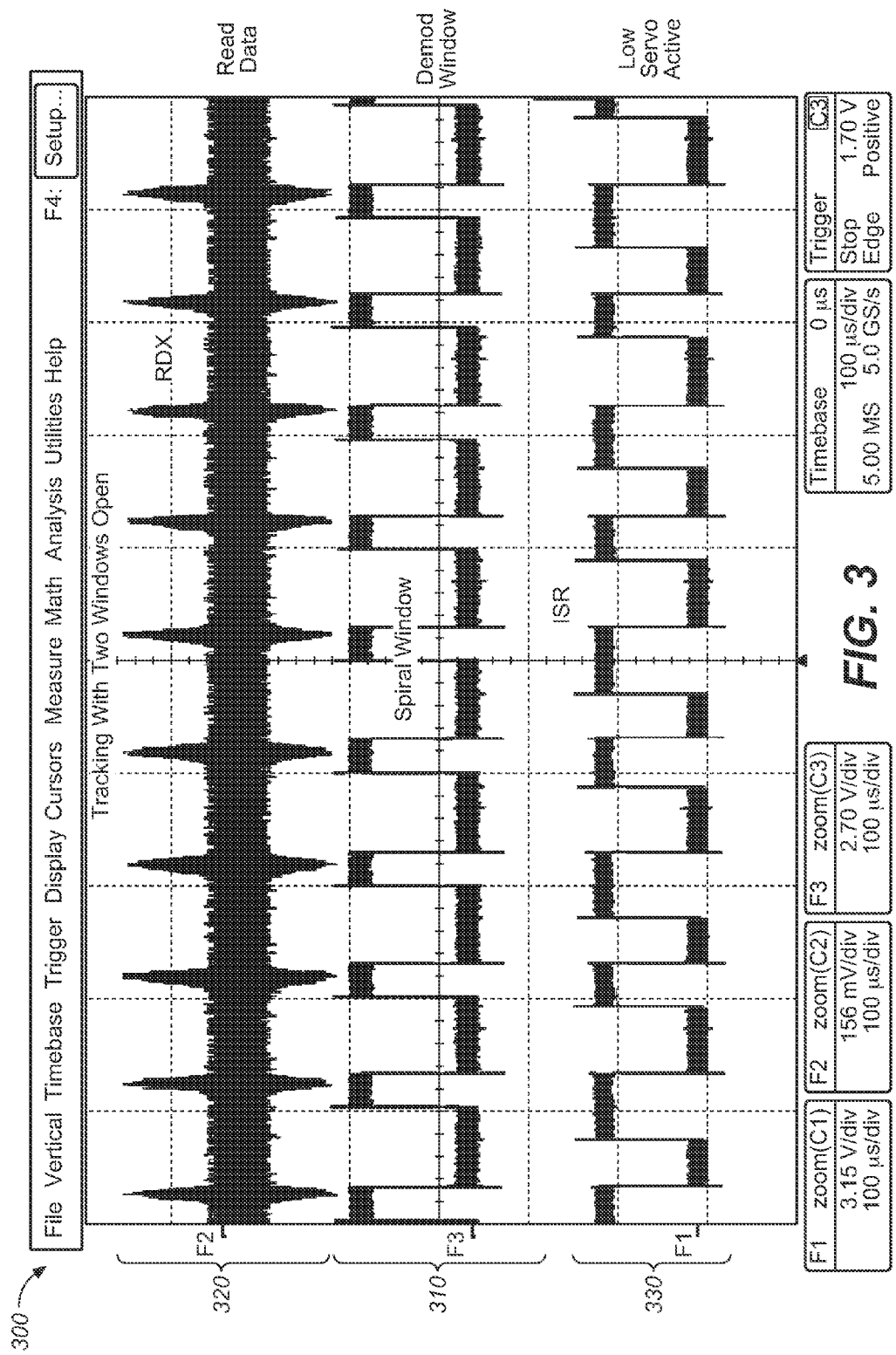
FIG. 3 is a screenshot of an example oscilloscope display that includes spiral windows and read data.

FIG. 3 is a screenshot of an example oscilloscope display 300 that includes spiral windows 310 and read data 320. The spiral windows 310 can be generated by the servo track window period generator 165, for example. The spiral windows 310 can be used to demodulate (e.g., detect) spirals in the read data 320 by centering the spiral windows 310 on the spirals. For example, locating spirals at the crash stop can include centering the spiral windows on a spiral to detect the spiral. The oscilloscope display 300 also includes a interrupt service routine (ISR) signal. The ISR signal 330 includes servo interrupts that can notify a microprocessor that spiral data is available for processing.

Figure 4:
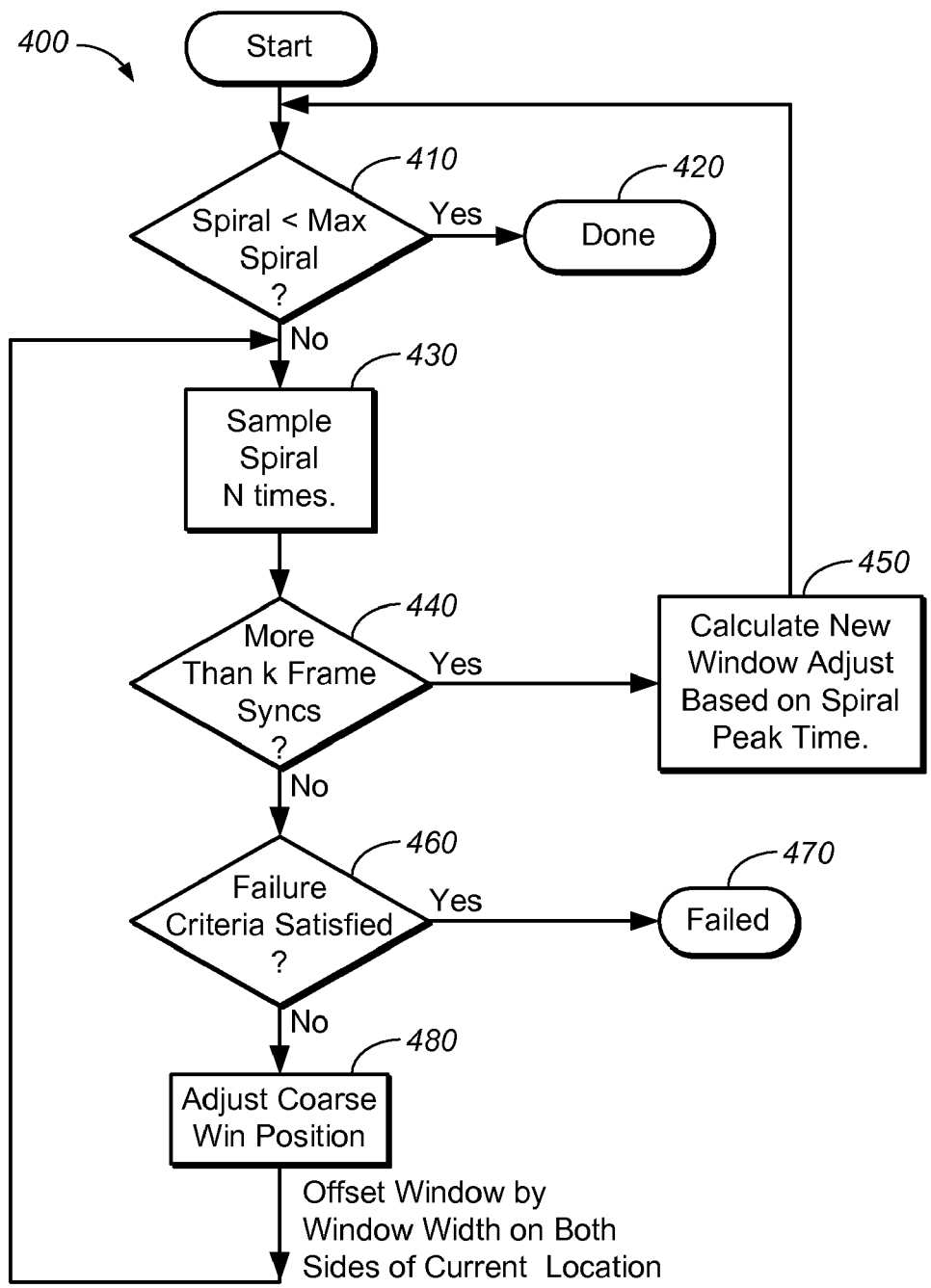
FIG. 4 is a flow chart showing an example process for adaptive window centering.

FIG. 4 is a flow chart showing an example process 400 for adaptive window centering. Spacing between spirals on a machine readable medium can vary. Window centering assures better performance in spiral detection by centering spiral windows more precisely over corresponding spirals. The process 400 includes determining 410 if a spiral is less than a maximum spiral. For example, a spiral window can be used to demodulate the spiral and compare the spiral to a maximum spiral (e.g., compare an integrated magnitude of a spiral to a predetermined maximum integrated magnitude of a spiral). If the spiral is less than the maximum spiral ("Yes" branch of step 410), then the process ends 420. If the spiral is not less than the maximum spiral ("No" branch of step 410), then the spiral is sampled 430 N times. If more than k frame syncs are determined from sampling the spiral N times ("Yes" branch of step 440), then a new window adjust is determined 450. For example, the new window adjust can be calculated by the servo track window period generator 165. The new window adjust can be expressed as:

New_window_adjust=Spiral_peak_time−Predicted_
spiral_peak_time+Current_window_adjust+Current_coarse_adjust;

where the New_window_adjust is a new value to adjust the spiral window, the Spiral_peak_time is a time at which the spiral peak occurs, the Predicted_spiral_peak_time is a time at which the spiral peak was predicted to occur, the Current_window_adjust is a current value to adjust the spiral window, and the Current_coarse_adjust is another current value to adjust the spiral window. Then, the process 400 returns to step 410.

If more than k frame syncs are not determined from sampling the spiral N times ("No" branch of step 440), then it can be determined 460 if the process fails. For example, the process can fail after a predetermined number of times for sampling the spiral. If failure criteria has been satisfied ("Yes" branch of step 460), then the process fails 470. If not ("No" branch of step 460), then the coarse window adjust is determined 480. For example, the spiral window can be offset by a window width on either side of a current location of the spiral window. The process 400 returns to step 430. Thereafter, the servo ISR can be aligned with the new location of the spiral window for processing the spiral data.

Figure 5:
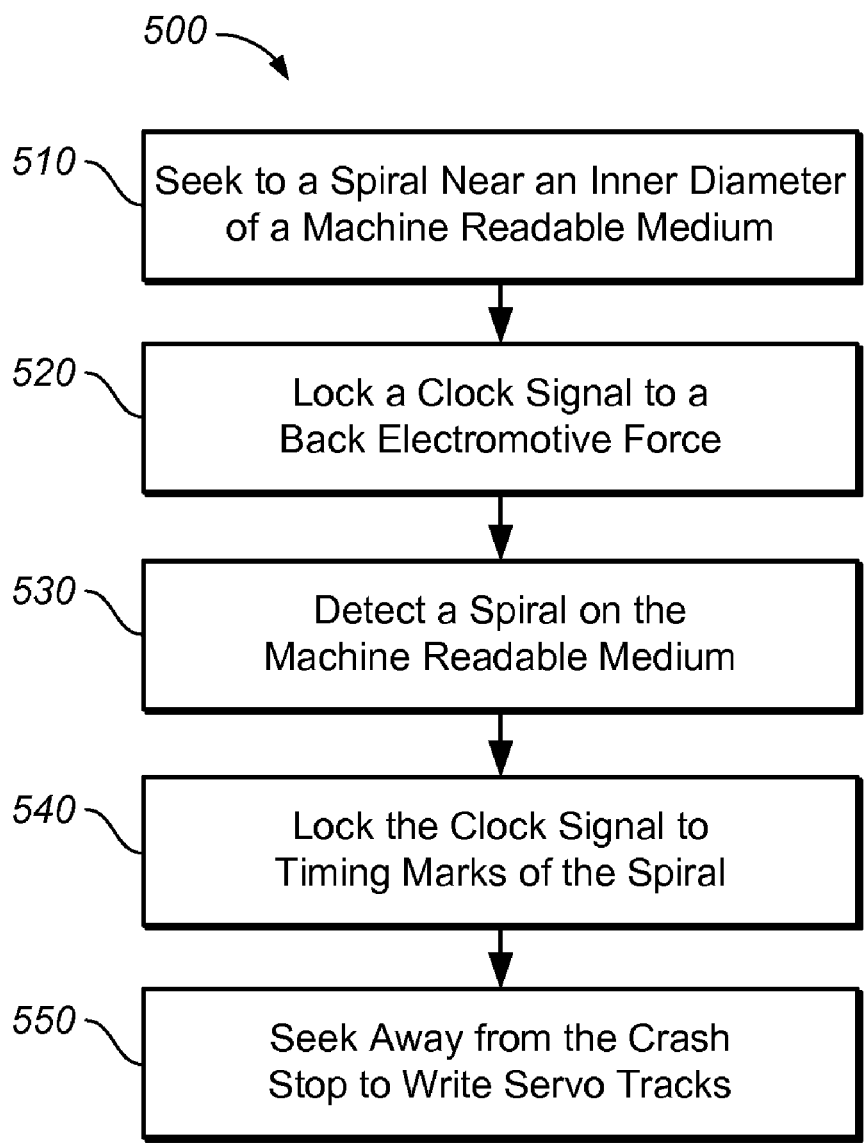
FIG. 5 is a flow chart showing an example process for calibrating a spiral servo using a crash stop.

FIG. 5 is a flow chart showing an example process 500 for calibrating a spiral servo using a crash stop. The process includes seeking 510 to a spiral near an inner diameter of a machine readable medium. A clock signal is locked 520 to a back electromotive force (BEMF) signal. For example, a BEMF phase locked loop (PLL) can be locked to a BEMF pulse. The BEMF PLL can provide an initial timing reference for a system clock. A spiral is detected 530 on the machine readable medium. For example, a detection module of the servo track detector 175 can use a spiral window to detect a spiral in a read signal, as described in process 400 (e.g., the process for adaptive window centering). The clock signal is locked 540 to timing marks of the spiral. For example, a spiral PLL can be locked to timing marks of the spiral (e.g., decoded spiral timing sync marks). Locking the clock signal to the timing marks of the spiral can include calibrating an average spiral peak time using the clock signal. The average spiral peak time can be determined at the crash stop by calculating the average timing of the spiral peaks, with respect to the timing references (BEMF) provided by the BEMF PLL, producing a timing offset between the BEMF PLL and the spiral PLL. For example, a comparison module of the servo track detector 175 can determine the timing offset. In some implementations, the process can further include seeking 550 away from the crash stop to write servo tracks. For example, the servo track generator 180 can generate servo tracks to be written on the machine readable medium. In some implementations, repetitive error control (REC) can be applied to calibrate a PLL. In some implementations, radial REC can be applied. For example, the servo controller 129 can include an error correction module that applies REC. If REC is applied, an actuator (e.g., a VCM actuator) can be prevented from making contact with the crash stop because the crash stop can disturb system dynamics.

In some implementations, continuous spiral demodulation can be used to phase lock spirals to a clock signal, as will be described below.

Figure 6:
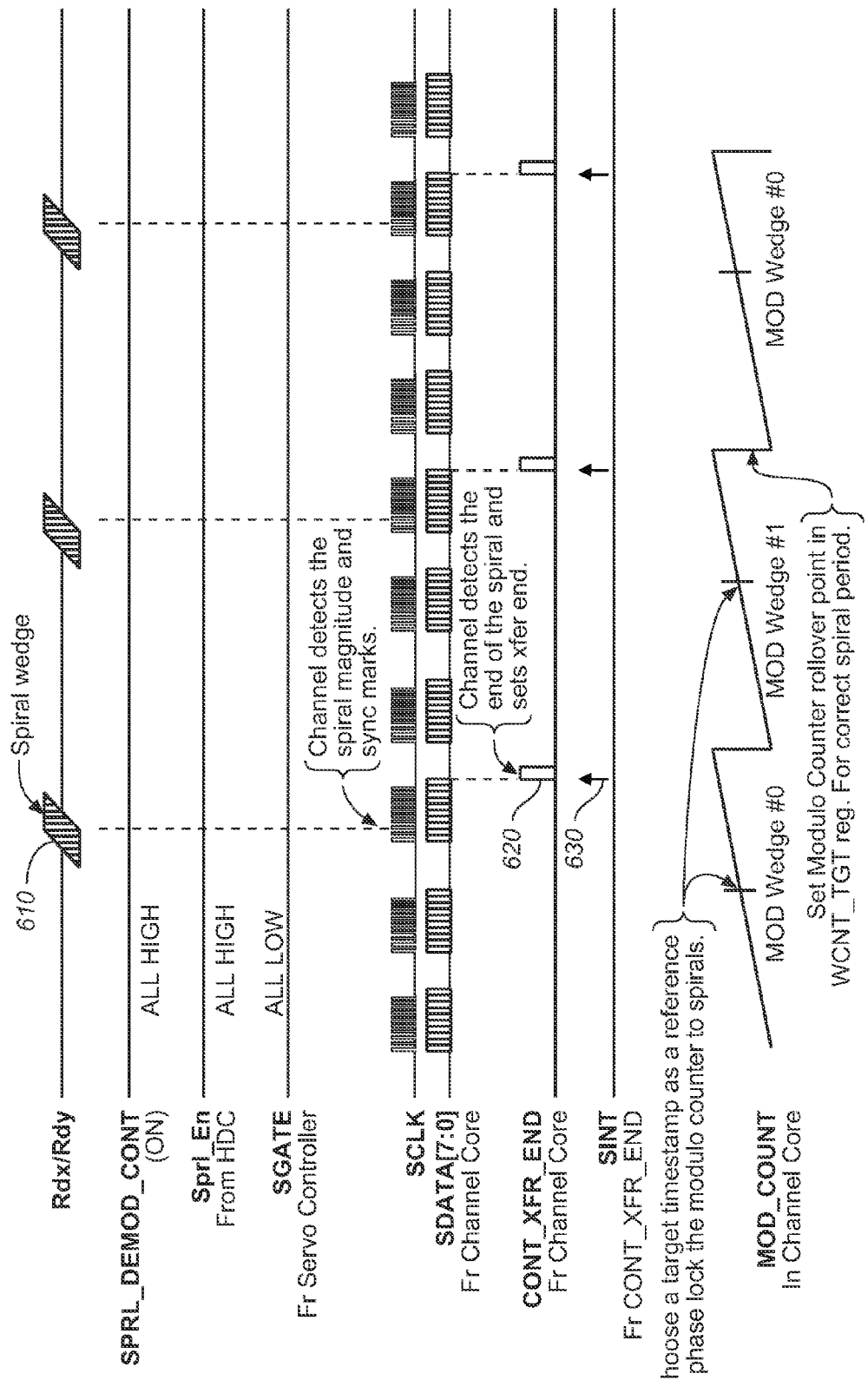
FIG. 6 is a diagram that includes example spiral information and timing information.

FIG. 6 is a diagram that includes example spiral information and timing information. The spiral information includes a Rdx/Rdy signal and a spiral data signal (SDATA). The Rdx/Rdy signal can include spiral wedges 610. The timing information includes a servo clock signal (SCLK), a continuous transfer end signal (CONT_XFR_END), an interrupt signal (SINT), and a modulo counter (MOD_COUNT). FIG. 6 also includes control signals: spiral demodulation continuous (SPRL_DEMOD_CONT), spiral enable (Sprl_En), and SGATE. SPRL_DEMOD_CONT can be used to control the mode of spiral detection. For example, SPRL_DEMOD_CONT can be set to high so that channel electronics continuously search for a signal that exceeds a predetermined spiral magnitude and contains spiral sync marks. The continuous search can be referred to as a "continuous mode".

The SCLK signal can increment the MOD_COUNT. The MOD_COUNT can be used to control the position of the spiral window, which can be used to detect and sync to spirals. While in a continuous mode, the SCLK and SDATA signals can continuously send spiral data across a bus to spiral data holding registers, for example. During the continuous mode, the Sprl_En signal can be set to high and the SGATE can be set to low because there are no standard servo wedges to detect for synchronization.

If the read channel detects a spiral signal magnitude that is greater than a predetermined spiral magnitude and can detect spiral sync marks, a CONT_XFER_END pulse 620 can be generated for the servo controller (e.g., servo controller 129). In response to the CONT_XFER_END pulse 620, the servo controller can generate an interrupt (e.g., a SINT pulse 630) to interrupt a microprocessor, for example, to indicate that spiral data is available.

Each time the channel electronics detects a spiral sync mark, a timestamp can be generated using the current value of the MOD_COUNT. For example, the timestamp can be generated and stored in a holding register. The timestamp can be used to phase lock the MOD_COUNT to spirals written on a machine readable medium. For example, a microprocessor can use the timestamp to phase lock the MOD_COUNT to the spirals. A target timestamp can be chosen from the MOD_COUNT. A peak of a spiral can be phase locked to the target timestamp. In some implementations, a SSW clock frequency can be adjusted to move the spiral peaks to the target timestamp. For example, a microprocessor can adjust the SSW clock frequency to move a spiral peak to the target timestamp and lock a corresponding spiral to the target timestamp. In some implementations, a phase error between the target timestamp and actual timestamp (e.g., phase error=actual timestamp−target timestamp) of the spiral peaks is generated. Adjusting the frequency offset of the SSW clock can speed up or slow down the MOD_COUNT to reduce the phase error.

Figure 7:
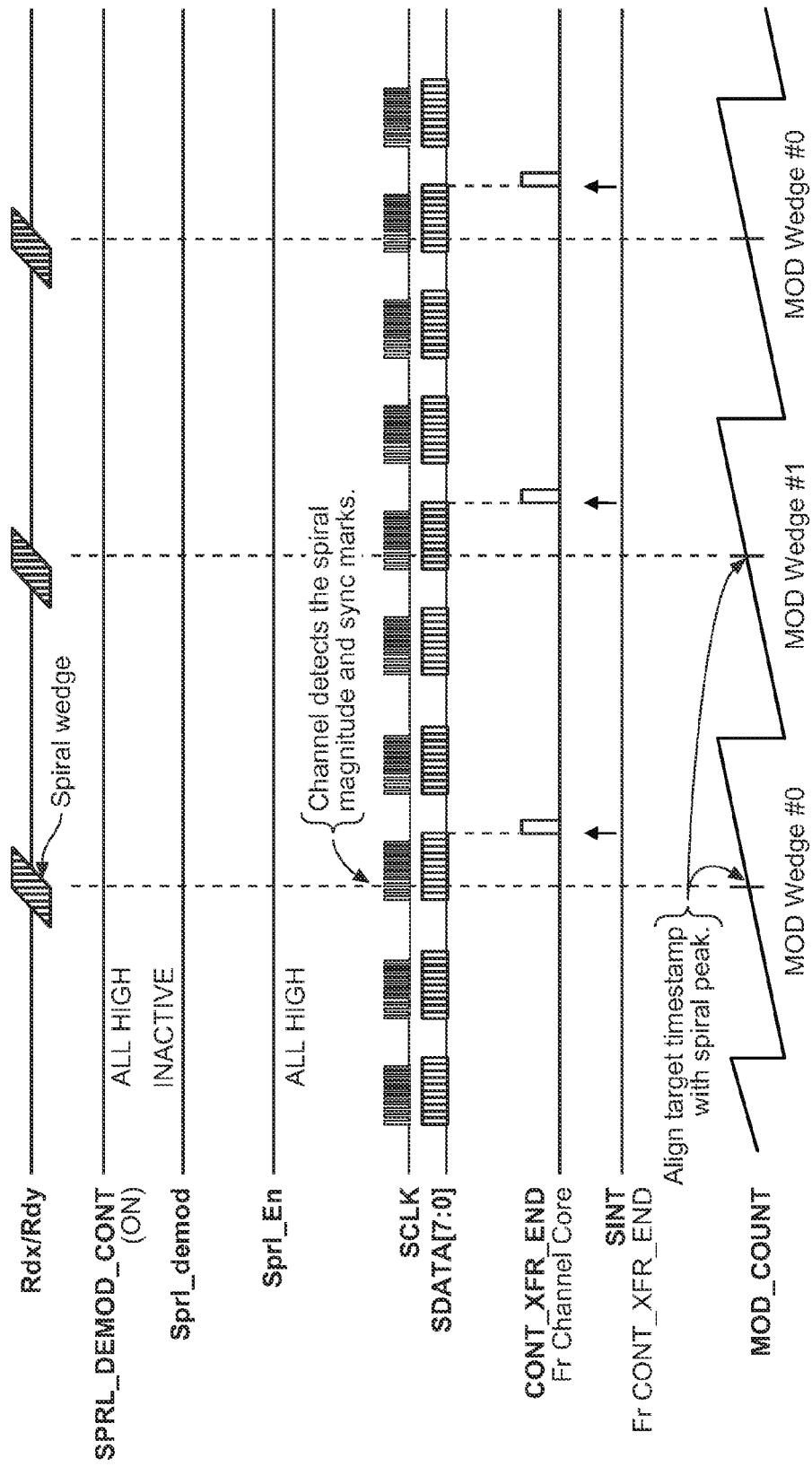
FIG. 7 is another diagram that includes example spiral information and timing information.

FIG. 7 is another diagram that includes example spiral information and timing information. As discussed previously, during the continuous mode, the SSW clock frequency offset control can be used to phase lock the target timestamp to the spiral peaks. Referring to FIG. 7, the MOD_COUNT is calibrated to be locked to the spirals (e.g., the spiral wedges 610) so that the target timestamps are aligned with the spirals. Again, a phase error between the target timestamp and the actual spiral peak timestamp can be generated, and the SSW clock frequency offset adjusted to reduce the phase error. After the MOD_COUNT is phase locked to the spirals, the channel electronics can be switched to a normal mode (e.g., a windowed mode), where spiral data information is only transferred to holding registers during the spiral windows (e.g., when a spiral window is open).

Figure 8:
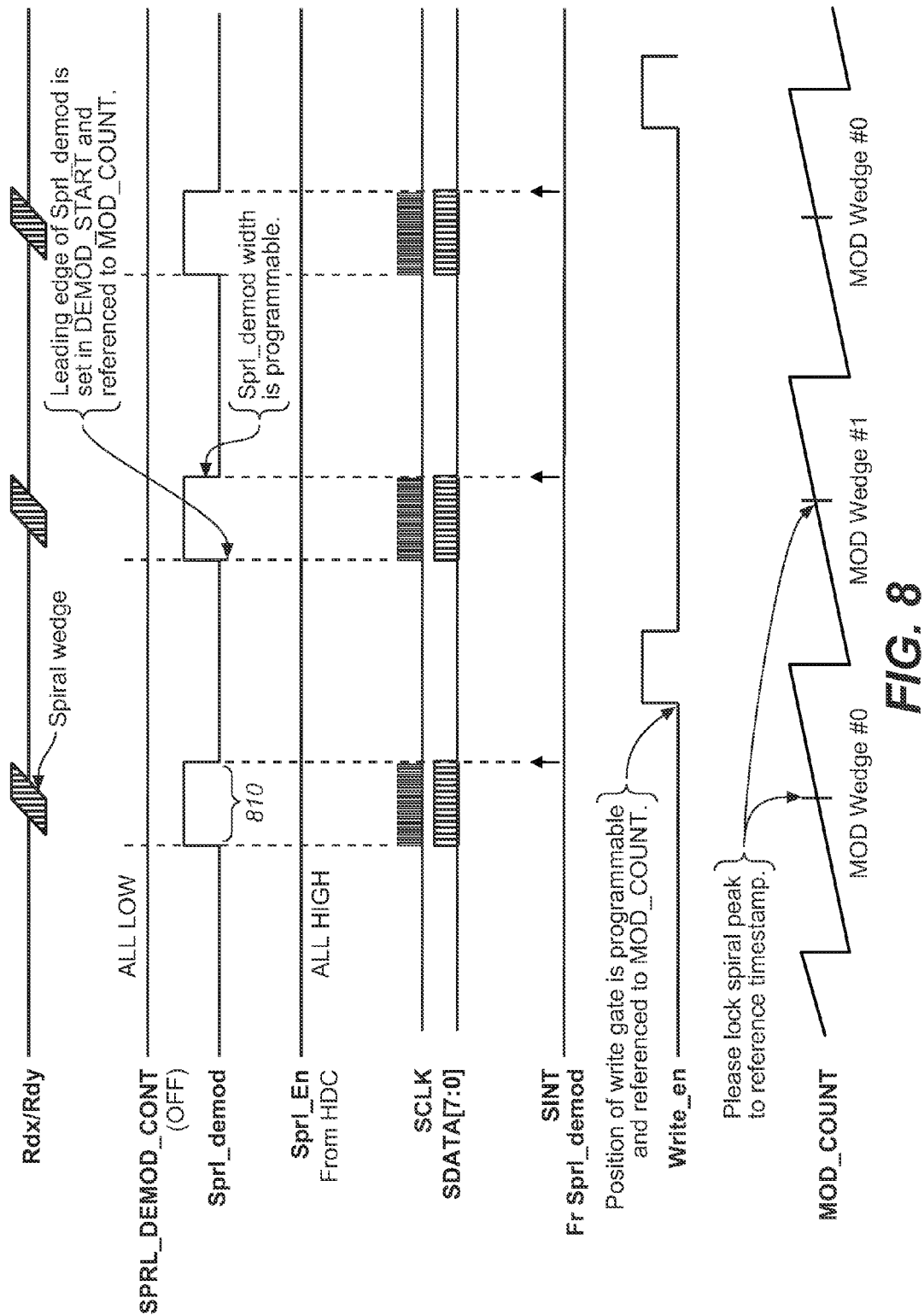
FIG. 8 is yet another diagram that includes example spiral information and timing information.

FIG. 8 is yet another diagram that includes example spiral information and timing information. The channel can switch out of continuous mode and into a normal mode by, for example, setting SPRL_DEMOD_CONT low, as shown in FIG. 8. In the normal mode, the SCLK and SDATA signals transfer spiral data information to the holding registers during the spiral windows (e.g., Sprl_demod windows). The SINT signal is also switched from activation on the CONT_XFER_END pulses to the trailing edge of the Sprl_demod windows (e.g., spiral windows 810).

Figure 9:
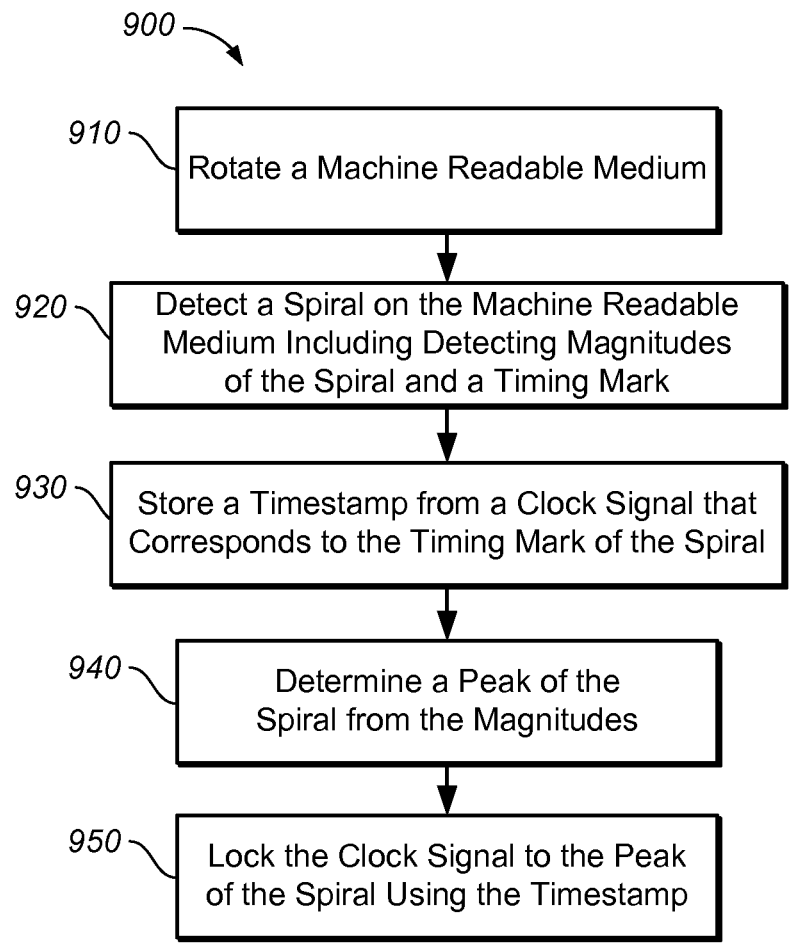
FIG. 9 is a flow chart showing an example process for calibrating a spiral servo using a continuous mode.

FIG. 9 is a flow chart showing an example process for calibrating a spiral servo using a continuous mode. The process 900 includes rotating 910 a machine readable medium. For example, a motor assembly (e.g., a voice coil motor) of a hard disk drive can rotate a machine readable medium (e.g., a disk). A spiral on the machine readable medium is detected 920, including detecting magnitudes of the spiral and a timing mark. For example, the servo track detector 175 can detect the spiral. A timestamp from a clock signal is stored 930 that corresponds to the timing mark of the spiral. For example, a holding register can store a timestamp from a clock signal. A peak of the spiral is determined 940 from the magnitudes. For example, a detection module of the servo track detector 175 can use a spiral window can to determine a peak of the spiral. The clock signal is locked 950 to the peak of the spiral using the timestamp. For example, a calibration module of the clock generator 150 can adjust the clock signal frequency to lock the clock signal to the peak of the spiral using the timestamp. In some implementations, a location of the spiral can be determined using the clock signal, and the spiral servo can be calibrated according to the location of the spiral. In some implementations, servo tracks can be written using the calibrated spiral servo. For example, the servo track generator 180 can generate servo tracks to be written on the machine readable medium.

Figure 10A:
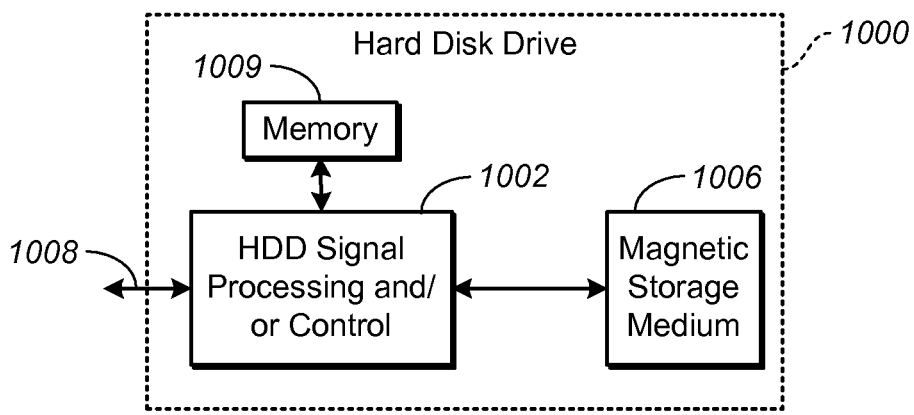
FIGS. 10A-10G show various example implementations of the described systems and techniques.

FIGS. 10A-10G show various example implementations of the described systems and techniques. Referring now to FIG. 10A, the described systems and techniques can be implemented in a hard disk drive (HDD) 1000. The described systems and techniques may be implemented in either or both signal processing and/or control circuits, which are generally identified in FIG. 10A at 1002. In some implementations, the signal processing and/or control circuit 1002 and/or other circuits (not shown) in the HDD 1000 may process data, perform coding and/or encryption, perform calculations, and/or format data that is output to and/or received from a magnetic storage medium 1006.

The HDD 1000 may communicate with a host device (not shown) such as a computer, mobile computing devices such as personal digital assistants, cellular phones, media or MP3 players and the like, and/or other devices via one or more wired or wireless communication links 1008. The HDD 1000 may be connected to memory 1009 such as random access memory (RAM), low latency nonvolatile memory such as flash memory, read only memory (ROM) and/or other suitable electronic data storage.

Figure 10B:
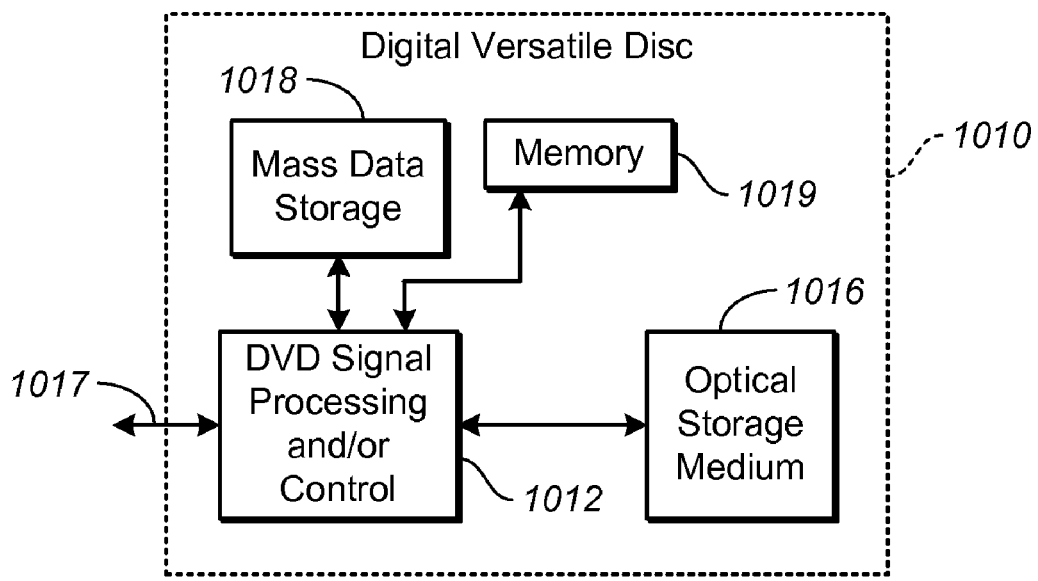

Referring now to FIG. 10B, the described systems and techniques can be implemented in a digital versatile disc (DVD) drive 1010. The described systems and techniques may be implemented in either or both signal processing and/or control circuits, which are generally identified in FIG. 10B at 1012, and/or mass data storage of the DVD drive 1010. The signal processing and/or control circuit 1012 and/or other circuits (not shown) in the DVD drive 1010 may process data, perform coding and/or encryption, perform calculations, and/or format data that is read from and/or data written to an optical storage medium 1016. In some implementations, the signal processing and/or control circuit 1012 and/or other circuits (not shown) in the DVD drive 1010 can also perform other functions such as encoding and/or decoding and/or any other signal processing functions associated with a DVD drive.

The DVD drive 1010 may communicate with an output device (not shown) such as a computer, television or other device via one or more wired or wireless communication links 1017. The DVD drive 1010 may communicate with mass data storage 1018 that stores data in a nonvolatile manner. The mass data storage 1018 may include a hard disk drive (HDD). The HDD may have the configuration shown in FIG. 10A. The HDD may be a mini HDD that includes one or more platters having a diameter that is smaller than approximately 1.8". The DVD drive 1010 may be connected to memory 1019 such as RAM, ROM, low latency nonvolatile memory such as flash memory and/or other suitable electronic data storage.

Figure 10C:
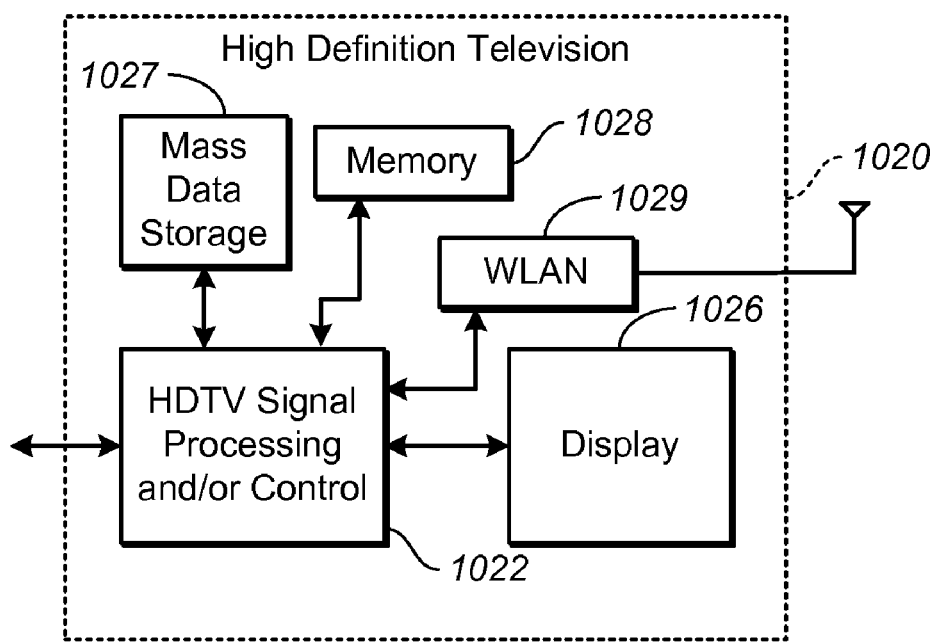

Referring now to FIG. 10C, the described systems and techniques can be implemented in a high definition television (HDTV) 1020. The described systems and techniques may be implemented in either or both signal processing and/or control circuits, which are generally identified in FIG. 10C at 1022, a WLAN interface and/or mass data storage of the HDTV 1020. The HDTV 1020 receives HDTV input signals in either a wired or wireless format and generates HDTV output signals for a display 1026. In some implementations, signal processing circuit and/or control circuit 1022 and/or other circuits (not shown) of the HDTV 1020 may process data, perform coding and/or encryption, perform calculations, format data and/or perform any other type of HDTV processing that may be required.

The HDTV 1020 may communicate with mass data storage 1027 that stores data in a nonvolatile manner such as optical and/or magnetic storage devices. At least one HDD may have the configuration shown in FIG. 10A and/or at least one DVD drive may have the configuration shown in FIG. 10B. The HDD may be a mini HDD that includes one or more platters having a diameter that is smaller than approximately 1.8". The HDTV 1020 may be connected to memory 1028 such as RAM, ROM, low latency nonvolatile memory such as flash memory and/or other suitable electronic data storage. The HDTV 1020 also may support connections with a WLAN via a WLAN interface 1029.

Figure 10D:
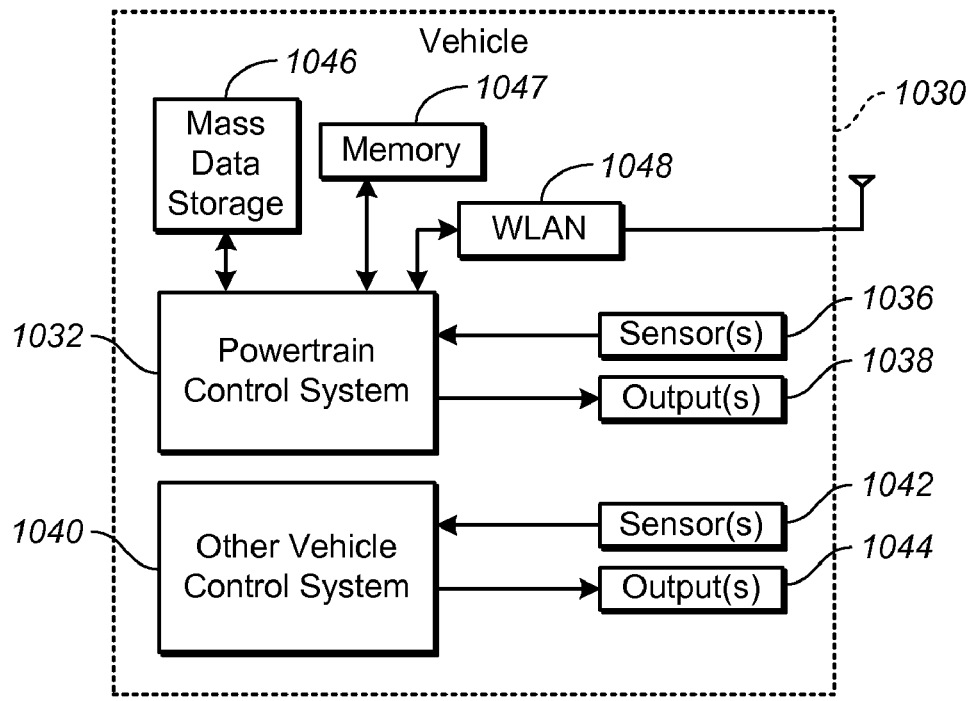

Referring now to FIG. 10D, the described systems and techniques may be implemented in a control system of a vehicle 1030, a WLAN interface and/or mass data storage of the vehicle control system. In some implementations, the described systems and techniques may be implemented in a powertrain control system 1032 that receives inputs from one or more sensors 1036 such as temperature sensors, pressure sensors, rotational sensors, airflow sensors and/or any other suitable sensors and/or that generates one or more output control signals such as engine operating parameters, transmission operating parameters, braking parameters, and/or other control signals to one or more output devices 1038.

The described systems and techniques may also be implemented in other control systems 1040 of the vehicle 1030. The control system 1040 may likewise receive signals from input sensors 1042 and/or output control signals to one or more output devices 1044. In some implementations, the control system 1040 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 1032 may communicate with mass data storage 1046 that stores data in a nonvolatile manner. The mass data storage 1046 may include optical and/or magnetic storage devices for example hard disk drives and/or DVD drives. At least one HDD may have the configuration shown in FIG. 10A and/or at least one DVD drive may have the configuration shown in FIG. 10B. The HDD may be a mini HDD that includes one or more platters having a diameter that is smaller than approximately 1.8". The powertrain control system 1032 may be connected to memory 1047 such as RAM, ROM, low latency nonvolatile memory such as flash memory and/or other suitable electronic data storage. The powertrain control system 1032 also may support connections with a WLAN via a WLAN interface 1048. The control system 1040 may also include mass data storage, memory and/or a WLAN interface (all not shown).

Figure 10E:
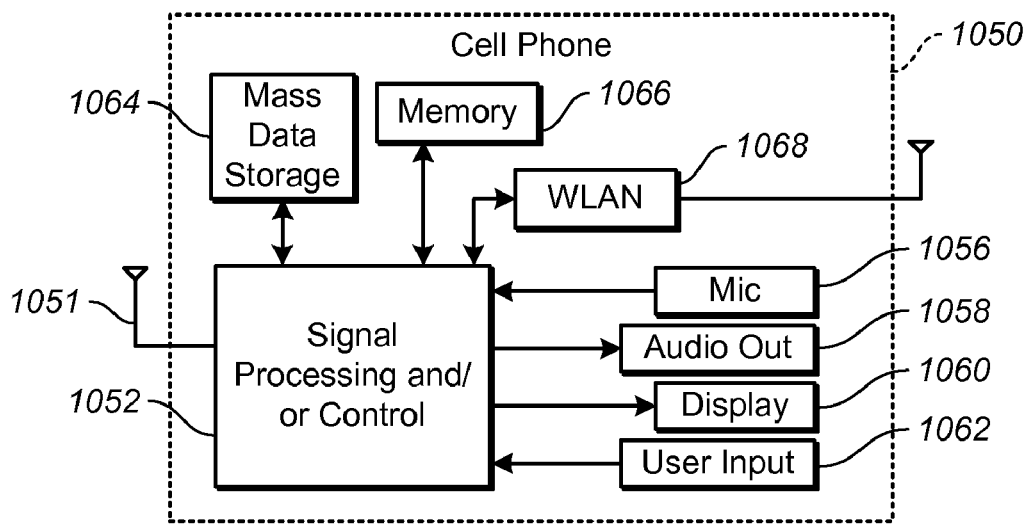

Referring now to FIG. 10E, the described systems and techniques can be implemented in a cellular phone 1050 that may include a cellular antenna 1051. The described systems and techniques may be implemented in either or both signal processing and/or control circuits, which are generally identified in FIG. 10E at 1052, a WLAN interface and/or mass data storage of the cellular phone 1050. In some implementations, the cellular phone 1050 includes a microphone 1056, an audio output 1058 such as a speaker and/or audio output jack, a display 1060 and/or an input device 1062 such as a keypad, pointing device, voice actuation and/or other input device. The signal processing and/or control circuits 1052 and/or other circuits (not shown) in the cellular phone 1050 may process data, perform coding and/or encryption, perform calculations, format data and/or perform other cellular phone functions.

The cellular phone 1050 may communicate with mass data storage 1064 that stores data in a nonvolatile manner such as optical and/or magnetic storage devices for example hard disk drives and/or DVD drives. At least one HDD may have the configuration shown in FIG. 10A and/or at least one DVD drive may have the configuration shown in FIG. 10B. The HDD may be a mini HDD that includes one or more platters having a diameter that is smaller than approximately 1.8". The cellular phone 1050 may be connected to memory 1066 such as RAM, ROM, low latency nonvolatile memory such as flash memory and/or other suitable electronic data storage. The cellular phone 1050 also may support connections with a WLAN via a WLAN interface 1068.

Figure 10F:
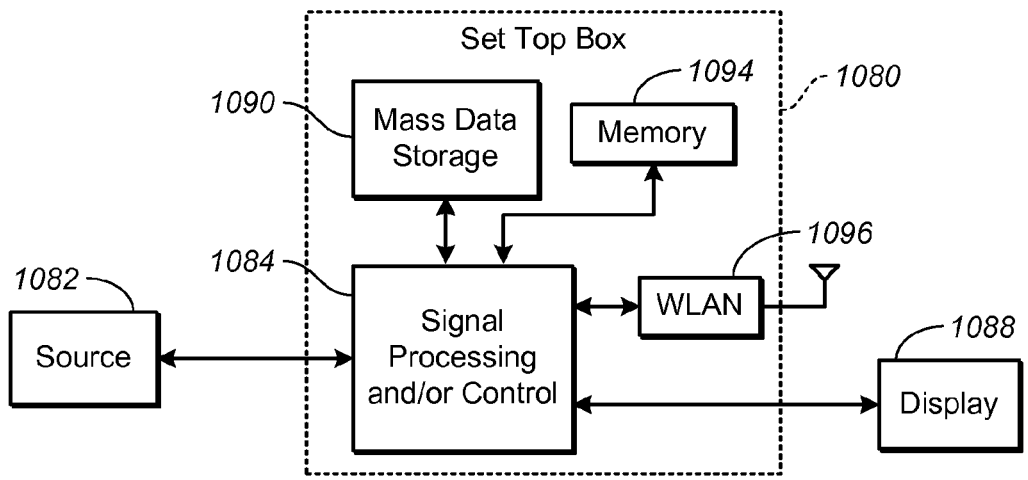

Referring now to FIG. 10F, the described systems and techniques can be implemented in a set top box 1080. The described systems and techniques may be implemented in either or both signal processing and/or control circuits, which are generally identified in FIG. 10F at 1084, a WLAN interface and/or mass data storage of the set top box 1080. The set top box 1080 receives signals from a source 1082 such as a broadband source and outputs standard and/or high definition audio/video signals suitable for a display 1088 such as a television and/or monitor and/or other video and/or audio output devices. The signal processing and/or control circuits 1084 and/or other circuits (not shown) of the set top box 1080 may process data, perform coding and/or encryption, perform calculations, format data and/or perform any other set top box function.

The set top box 1080 may communicate with mass data storage 1090 that stores data in a nonvolatile manner. The mass data storage 1090 may include optical and/or magnetic storage devices for example hard disk drives and/or DVD drives. At least one HDD may have the configuration shown in FIG. 10A and/or at least one DVD drive may have the configuration shown in FIG. 10B. The HDD may be a mini HDD that includes one or more platters having a diameter that is smaller than approximately 1.8". The set top box 1080 may be connected to memory 1094 such as RAM, ROM, low latency nonvolatile memory such as flash memory and/or other suitable electronic data storage. The set top box 1080 also may support connections with a WLAN via a WLAN interface 1096.

Figure 10G:
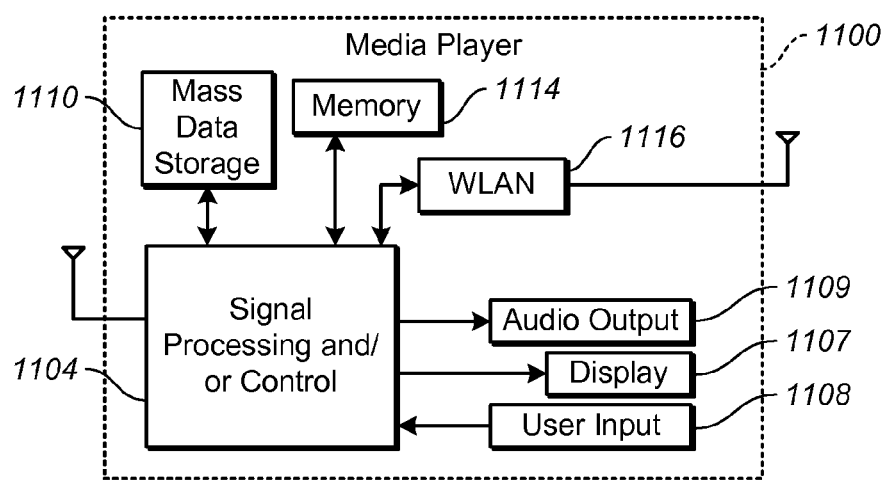

Referring now to FIG. 10G, the described systems and techniques can be implemented in a media player 1100. The described systems and techniques may be implemented in either or both signal processing and/or control circuits, which are generally identified in FIG. 10G at 1104, a WLAN interface and/or mass data storage of the media player 1100. In some implementations, the media player 1100 includes a display 1107 and/or a user input 1108 such as a keypad, touchpad and the like. In some implementations, the media player 1100 may employ a graphical user interface (GUI) that typically employs menus, drop down menus, icons and/or a point-and-click interface via the display 1107 and/or user input 1108. The media player 1100 further includes an audio output 1109 such as a speaker and/or audio output jack. The signal processing and/or control circuits 1104 and/or other circuits (not shown) of the media player 1100 may process data, perform coding and/or encryption, perform calculations, format data and/or perform any other media player function.

The media player 1100 may communicate with mass data storage 1110 that stores data such as compressed audio and/or video content in a nonvolatile manner. In some implementations, the compressed audio files include files that are compliant with MP3 (Moving Picture experts group audio layer 3) format or other suitable compressed audio and/or video formats. The mass data storage may include optical and/or magnetic storage devices for example hard disk drives and/or DVD drives. At least one HDD may have the configuration shown in FIG. 10A and/or at least one DVD drive may have the configuration shown in FIG. 10B. The HDD may be a mini HDD that includes one or more platters having a diameter that is smaller than approximately 1.8". The media player 1100 may be connected to memory 1114 such as RAM, ROM, low latency nonvolatile memory such as flash memory and/or other suitable electronic data storage. The media player 1100 also may support connections with a WLAN via a WLAN interface 1116. Still other implementations in addition to those described above are contemplated.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. An apparatus comprising:
   a servo track detector that detects a spiral on a machine readable medium;
   a clock generator that generates a clock signal and locks the clock signal to timing marks of the spiral to calibrate an average spiral peak time; and
   a servo track window period generator that generates a spiral window to determine a location of the spiral using the average spiral peak time.

2. The apparatus of claim 1, wherein the servo track detector includes a detection module that determines spiral peak times using the spiral window.

3. The apparatus of claim 2, wherein the servo track detector further includes a comparison module that determines a timing offset between the clock signal and the timing marks of the spiral.

4. The apparatus of claim 1, further comprising:
   a servo track generator that generates servo tracks using the spiral.

5. The apparatus of claim 1, further comprising:
   an error correction module that applies repetitive error control.

6. A method comprising:
   seeking to an inner diameter of a machine readable medium;
   detecting a spiral on the machine readable medium;
   locking a clock signal to timing marks of the spiral including
       calibrating an average spiral peak time using the clock signal;
   determining a location of the spiral using the average spiral peak time; and
   calibrating a spiral servo according to the location of the spiral.

7. The method of claim 6, wherein seeking to an inner diameter includes seeking to a crash stop of the machine readable medium.

8. The method of claim 6, further comprising:
   seeking away from the inner diameter of the machine readable medium; and
   writing servo tracks using the spiral servo.

9. The method of claim 6, wherein locking the clock signal to timing marks further includes:
   applying repetitive error control.

10. A system comprising:
    a machine readable medium; and
    a servo controller including:
        a servo track detector that detects a spiral on the machine readable medium;
        a clock generator that generates a clock signal and locks the clock signal to timing marks of the spiral to calibrate an average spiral peak time; and
        a servo track window period generator that generates a spiral window to determine a location of the spiral using the average spiral peak time.

11. An apparatus comprising:
    a servo track detector that detects a spiral on a machine readable medium;
    a clock generator that generates a clock signal and locks the clock signal to timing marks of the spiral to calibrate an average spiral peak time; and
    means for generating a spiral window to determine a location of the spiral using the average spiral peak time.

* * * * *